United States Patent [19]
Wu

[11] Patent Number: 5,658,054
[45] Date of Patent: Aug. 19, 1997

[54] WHEEL MOUNTING STRUCTURE OF A GOLF CART

[75] Inventor: Jiin-Tang Wu, Taipei Hsien, Taiwan

[73] Assignee: Masters Cy Industrial Co., Ltd., Taiwan, Taiwan

[21] Appl. No.: 578,999

[22] Filed: Dec. 27, 1995

[51] Int. Cl.$^6$ .................................................. B60B 37/00
[52] U.S. Cl. ............................ 301/111; 301/119; 301/121
[58] Field of Search ................................. 301/111, 112, 301/119, 121, 122, 124.1, 126, 131; 280/642, 645, 646, 647, 652, 654, DIG. 4, DIG. 6; 403/315, 316, 319, 321, 322, 325, 324

[56] References Cited

U.S. PATENT DOCUMENTS

| | | | |
|---|---|---|---|
| 597,315 | 1/1898 | Day | 301/121 |
| 672,031 | 4/1901 | Clouse | 301/121 |
| 4,978,175 | 12/1990 | Wu | 301/111 X |
| 5,507,566 | 4/1996 | Chen | 301/111 |
| 5,529,385 | 6/1996 | Tsao | 301/111 |

*Primary Examiner*—Russell D. Stormer
*Attorney, Agent, or Firm*—Varndell Legal Group

[57] ABSTRACT

A wheel mounting structure including a wheel shaft fastened to a locating hole on the leg of a golf club carrier to hold a wheel, and a lever pivoted to the leg and turned to lock the wheel shaft. The wheel shaft has a locating block at one end fitted into the locating hole, a collar connected to the locating block and abutting the locating hole. The lever has a stop rod section and a retainer rod section which are respectively forced into engagment with a recessed bottom hole on the locating block and a bottom retaining groove on the collar when the lever is turned to the locking position to lock the wheel shaft on the leg of the gold club carrier.

1 Claim, 4 Drawing Sheets

WHEEL MOUNTING STRUCTURE OF A GOLF CART

BACKGROUND AND SUMMARY OF THE INVENTION

The present invention relates to golf carts, and relates more specifically to a wheel mounting structure which improve the structure of the wheel assembly disclosed in U.S. Pat. No. 4,978,175.

U.S. Pat. No. 4,978,175 discloses a device for coupling a wheel to a golf club carrier. As illustrated in FIGS. 1 and 2, the device comprises a sleeve member inserted into the axle of a wheel, a fixing rod extending from the leg of a golf club carrier and inserted through the head portion of the sleeve member into the inner diameter thereof, and a lever turnably connected between two parallel lugs by a pivot for locking the sleeve member. The head portion has radial grooves, which engage with radial ribs on the fixing rod upon the insertion of the fixing rod into the sleeve member. The lever has a clamping head, which is forced into engagement with a hole on the tongue of the head portion of the sleeve member when the lever is depressed. This wheel mounting structure is complicated to install. Furthermore, because the fixing rod is made from stainless steel, it can not be injection molded on the leg of the golf club carrier. Therefore, the installation cost of this wheel mounting structure in high.

The present invention has been accomplished to provide a wheel mounting structure for mounting a wheel to the leg of a golf club carrier which is easy to install and inexpensive to manufacture. According to the present invention, the wheel mounting structure comprises a wheel shaft fastened to a locating hole on the leg of a golf club carrier to hold a wheel, and a lever pivoted to the leg and turned to lock the wheel shaft, wherein the wheel shaft has locating block at one end fitted into the locating hole, a collar connected to the locating block and stopped outside the locating hole; the lever has a stop rod section and a retainer rod section which are respectively forced into engagement with a recessed bottom hole on the locating block and a bottom retaining groove on the collar when the lever is turned to the locking position to lock the wheel shaft. Because most parts of this wheel mounting structure are injection-molded from plastics, the installation cost of this wheel mounting structure is less expensive.

DETAILED DESCRIPTION OF THE PREFERRED EMBODIMENT

Figure 1:
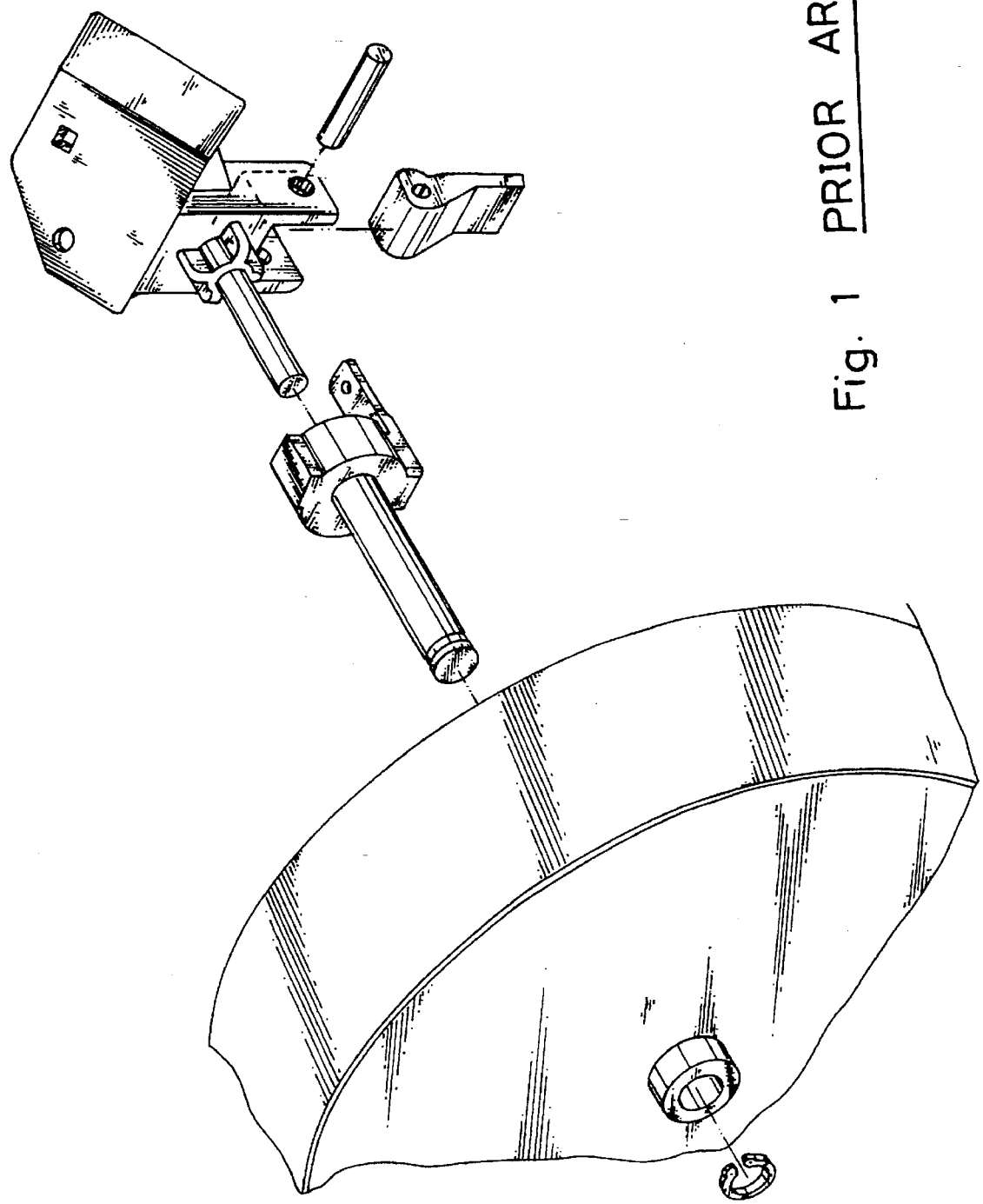
FIG. 1 is an exploded view of a device for coupling a wheel to a golf club carrier according to the prior art.
Figure 2:
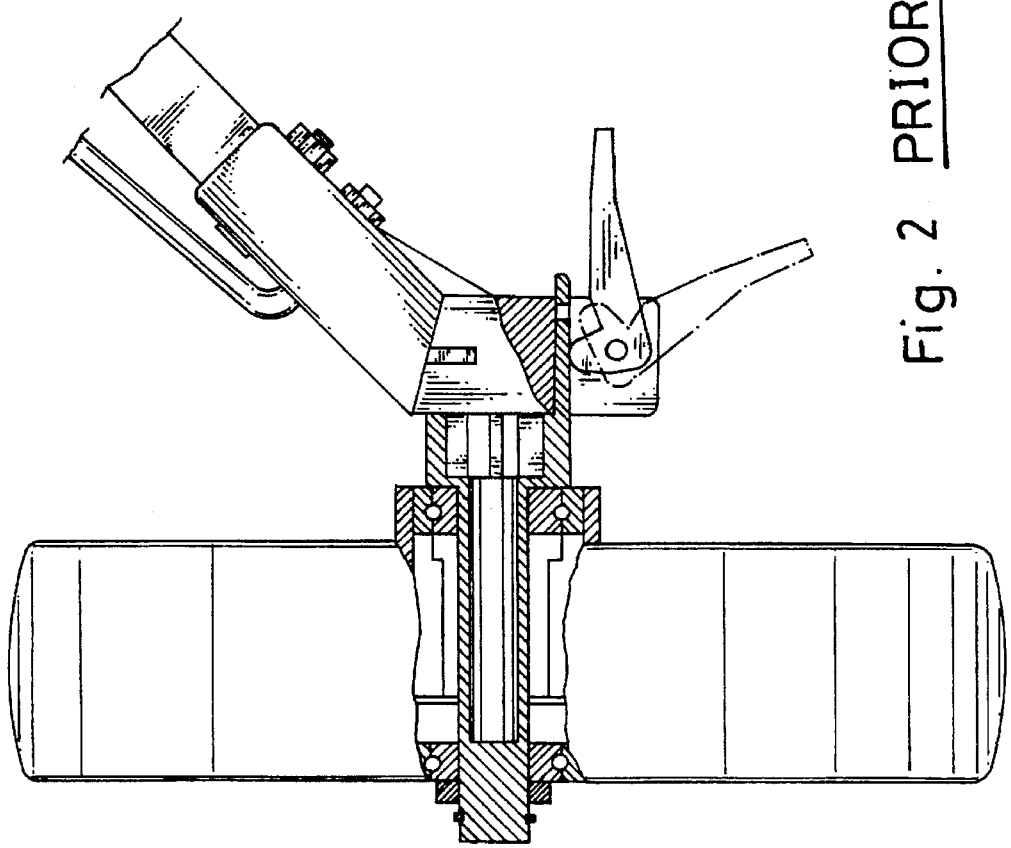
FIG. 2 is a sectional assembly view of FIG. 1.
Figure 3:
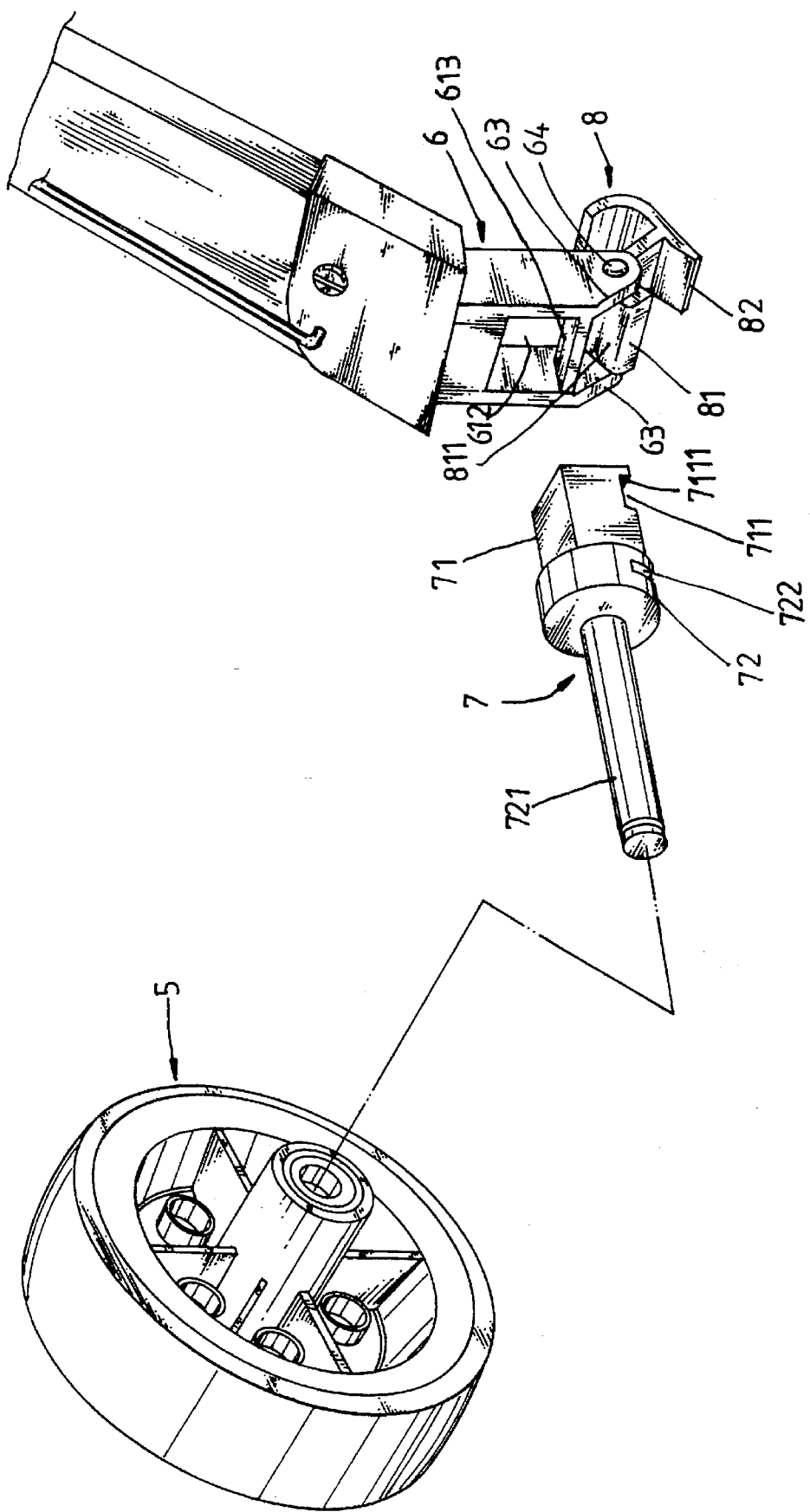
FIG. 3 is an exploded view of a wheel mounting structure according to the present invention.
Figure 4:
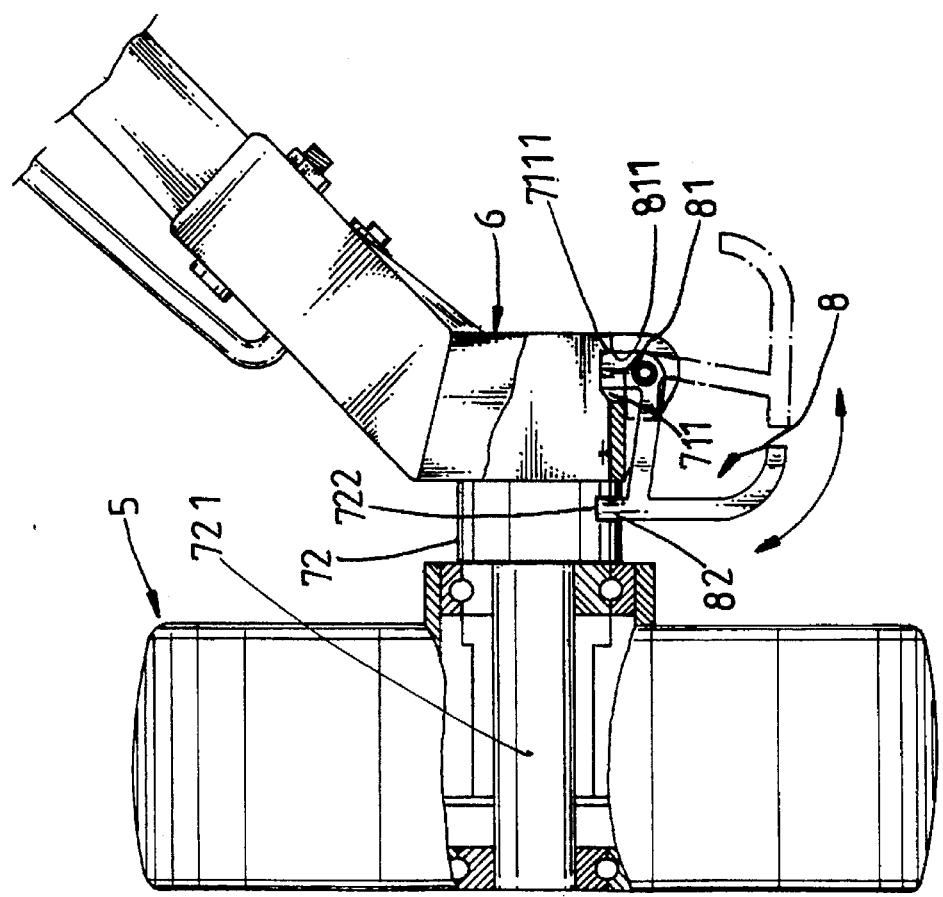
FIG. 4 is a sectional assembly view of FIG. 3.

Referring to FIGS. 3 and 4, a wheel shaft 7 is fastened to the leg, referenced by 6, of a golf club carrier, and a wheel 5 is rotatably mounted around the wheel shaft 7. The leg 6 comprises a locating hole 612 with a bottom wall 613 near the free end for mounting the wheel shaft 7, two parallel lugs 63 downwardly extending from the free end, and a lever 8 pivotably connected between the lugs 63 by a pivot 64. The lever 8 can be turned between the unlocking position to release the wheel shaft 7, and the locking position to lock the wheel shaft 7. The wheel shaft 7 comprises an elongated shaft body 721 at one end, which holds the wheel 5, a locating block 71 at an opposite end fitted into the locating hole 612, and a collar 72 in the middle between the shaft body 721 and the locating block 71. The lever 8 comprises a stop rod section 81 and a retainer rod section 82. The locating block 72 of the wheel shaft 7 has a recessed bottom hole 711. The collar 72 of the wheel shaft 7 has a bottom retaining groove 722. When the lever 8 is turned to the locking position, the stop rod section 81 and retainer rod section 82 of the lever 8 are respectively forced into the recessed bottom hole 711 of the locating block 72 and the bottom retaining groove 722 of the collar 72, and the inner side 811 of the stop rod section 81 is stopped against the periphery 7111 of the recessed bottom hole 711, and therefore the wheel shaft 7 is locked. In the locked position the bottom wall 613 of the hole 612 of the leg 6 separates the groove 722 and the hole 711, the collar 72 abuts the bottom wall 613, and the block 71 rests on the bottom wall 613.

I claim:

1. A wheel mounting structure comprising a leg extending from the frame of a golf club carrier and having a locating hole; a wheel shaft having a locating block at one end received in said locating hole of said leg, an elongated shaft body at an opposite end, a collar disposed between said locating block and said elongated shaft body and abutting said locating hole of said leg, and a wheel rotatably mounted on said elongated shaft body of said wheel shaft, said locating block of said wheel shaft having a recessed bottom hole and a bottom retaining groove, said leg including a lever pivoted thereto and rotatable between a first position for securing said wheel shaft within said locating hole of said leg and a second position for releasing said wheel shaft from said locating hole of said leg, said lever including a stop rod section and a retainer rod section, said stop rod section and said retainer rod section respectively forced into engagement with said recessed bottom hole and said bottom retaining groove of said wheel shaft when said lever is turned from said second portion to said first position.

* * * * *